United States Patent [19]

Liepa

[11] 4,001,441
[45] Jan. 4, 1977

[54] MEAT ANALOG

[75] Inventor: Alexander L. Liepa, Cincinnati, Ohio

[73] Assignee: The Procter & Gamble Company, Cincinnati, Ohio

[22] Filed: Dec. 21, 1970

[21] Appl. No.: 100,549

[52] U.S. Cl. .............................. 426/104; 426/536; 426/802; 426/302; 426/506

[51] Int. Cl.$^2$ .......................................... A23J 3/00

[58] Field of Search .......... 99/14, 17, 18; 426/104, 426/536, 802, 302, 506

[56] References Cited

UNITED STATES PATENTS

| | | | |
|---|---|---|---|
| 2,682,466 | 6/1954 | Boyer | 99/14 |
| 2,830,902 | 4/1958 | Anson et al. | 99/14 |
| 3,102,031 | 8/1963 | MacAllister et al. | 99/14 |

Primary Examiner—Joseph M. Golian
Attorney, Agent, or Firm—Louis G. Xiarhos

[57] ABSTRACT

A process of making meat analogs which comprises forming a dry protein mix, adjusting the moisture content of the dry mix to form a dough-like protein wet mix, sheeting the protein wet mix to form a coherent workable protein dough sheet, cutting the sheet to form fiber-like strands, aggregating the strands into a desired fiber alignment, preferably coating the aligned fibers with an edible binder material, and stabilizing the fibers to form a coherent fiber mass closely resembling meat in appearance, texture, and eating quality.

38 Claims, No Drawings

MEAT ANALOG

BACKGROUND OF THE INVENTION

As is well known by the consumer, the cost of meat and meat-based products is continually rising. The rising costs have forced many people to modify their nutritional intake in an effort to cut down upon the intake of expensive meat or meat-based products. The result of course is a diet which does not have sufficient protein present and is therefore nutritionally deficient.

Because of the rising cost of meat and meat-based products and because of the real nutritional needs of many people which are not being satisfied, in recent years much work has been done in regard to preparing meat analog products. Meat analogs, or in other words synthetic meats, are advantageous when compared with natural meat products, not only from the standpoint of cost, but also from the standpoint of being low calorie and sometimes actually higher in protein content. Therefore, meat analogs can be made superior from the standpoint of nutrition as well as cost.

Currently, most meat analog products are made by two basic processes: that is, either fiber spinning or thermoplastic extrusion. The fiber spinning technique is an adaptation of the spun fiber method of making synthetic fibers utilized in the textile industry. In this method, fibrous protein products are prepared from proteins such as soy protein by forming a spinning dope from alkali-treated protein and extruding the dope through a perforated die or membrane into an aqueous precipitating bath which contains an acid and a salt. The acid bath sets the filaments or fibers which are formed in the bath. The filaments may be bundled together and stretched to orient the molecular structure of the fibers. For further details in regard to the fiber spinning technique, see the basic Boyer U.S. Pat. No. 2,682,466, issued June 29, 1954, which relates to spun fiber meat analogs. Other patents relating to such a process include Boyer et al., U.S. Pat. No. 2,730,448, issued Jan. 10, 1956, and Boyer, U.S. Pat. No. 2,730,447, also issued on Jan. 10, 1956.

The other principal method of forming meat analog products is by thermoplastics extrusion which is an adaptation of technology involved in making ready-to-eat cereal food products. The thermoplastic extrusion process involves preparing a mixture of protein, water, flavor, and other minors, and thereafter feeding the mixture into a cooker-extruder wherein it is subjected to heat and pressure, and subsequently extruding the mixture. The extrudate as it enters into the atmosphere expands to form what has been characterized as "meat-like" fibers. For examples of patents describing the thermoplastic extrusion techniques in forming meat analogs, see U.S. Pat. Nos. MacAllister et al., 3,102,031, issued Aug. 27, 1963, Atkinson, U.S. Pat. No. 3,488,770, issued Jan. 6, 1970, and British Pat. Nos. 1,174,906, published Dec. 17, 1969, and 1,105,904, published Mar. 13, 1968.

While both the fiber spinning technique adapted from the textile industry and the thermoplastic extrusion technique adapted from the ready-to-eat cereal industry have commonly been utilized to provide meat analog materials, it is generally recognized in the industry that the fiber spinning technique is most advantageous from the standpoint of forming actual meat-like fibers, However, the fiber spinning technique is quite expensive as well as complicated, and therefore the use of that technique tends to negate one of the primary purposes for forming meat analog products, i.e. an inexpensive meat substitute. Moreover, it is generally recognized by experts as well as consumers that neither of the above described processes actually produce a product which is meat-like in eating quality.

A third method of forming meat analog products which combines technology from both the spinning method and the extrusion method generally involves formation of a protein dough-like material and thereafter shaping the protein dough, and subsequently either forming layers of protein dough material or, in some cases utilizing a single layer and heating the dough-like material. Of course, the ultimate product prepared by this type of process has differing product characteristics, depending upon how, or whether, layers of material are laminated. For examples of this type of process see in particular two patents issued to Anson et al., U.S. Pat. Nos. 2,802,737 issued Aug 13, 1957, and 2,830,902, issued Apr. 15, 1958.

This process which combines technology from both the fiber spinning technique and the thermoplastic extrusion technique, cited by the Anson et al. patents, is notably deficient in producing a product which has meat-like eating quality. In other words, depending upon how the Anson et al. dough sheet is "sandwhiched", the product may have the appearance and texture of meat; however, when actually eaten the mouth feel, i.e. eating quality, is different from that of meat. Presumably this is so because of a lack of stringiness when eating the product.

While some of the prior art methods have allowed formation of a product which has an appearance and texture closely resembling that of ordinary meat products, there is no presently known meat analog product which duplicates the eating quality of actual meat as well as the texture and appearance. The term "eating quality" as utilized herein is intended to mean duplication of the mouth feel sensation obtained while eating meat. The eating quality of actual meat is described as "chewy" and "stringy" in nature. Since this chewiness and stringiness is associated with eating actual meats, if meat analogs are to be accepted it is evident that they also must be prepared in such a manner that they have chewiness and stringiness. Duplication of the actual eating quality of meat is hard because while fibers may be aligned unidirectionally and parallel, it is another matter to provide a sufficient amount of adhesiveness to allow the material to hold together so that it has the texture and appearance of meat and yet not have excessive adhesiveness which, because the fibers are not easily separated, destroys the stringy eating quality.

It is an object of this invention to provide meat analogs which resemble in appearance and texture natural meats, by a process which is especially economical in that it does not involve fiber spinning nor does it necessarily involve thermoplastic extrusion and by a process which is not limited to the utilization of heat-coagulable protein.

Additionally, it is an object of this invention to provide a process which not only duplicates meat in appearance as well as texture but which duplicates the actual eating quality of meat. The eating quality is duplicated by a process which involves binding individual fibers, preferably with an edible binder, such that there is provided adequate cohesiveness to hold the product in a coherent fiber mass, but not enough cohesiveness to destroy the mouth feel of striated meat-like fibers, i.e. meat eating quality.

SUMMARY OF THE INVENTION

This invention relates to a meat analog product and to a method of making a meat analog product. The product is produced in such a manner that it closely, if not identically, resembles natural meats in appearance, texture, and eating quality. Like natural meats, the product of this invention, if desired, can have unidirectional parallel fiber structure. The process involves forming a dry protein mix, adjusting the moisture content of the dry mix to form a dough-like protein wet mix, sheeting the wet mix to form a coherent workable protein dough sheet, cutting the sheet to form fiber-like strands, aggregating the strands into a desired alignment, preferably coating the aligned fibers with an edible binder material and, finally, stabilizing the fibers to form a coherent fiber mass. In the coherent fiber mass, individual fibers are aggregated and fused by a process which provides sufficient binding to hold the fibers together but yet allows easy separation of the fibers during eating to thereby duplicate the stringy eating quality of actual meat.

The method of achieving the results of this invention and accomplishing the previously enumerated objects will become apparent from the following description of the invention.

DETAILED DESCRIPTION OF THE INVENTION

As used hereinafter, the terms "protein mix" and "dry protein mix", the two being used interchangeably, are meant to include all of the dry ingredients utilized in the initial formation of a protein mix. The dry protein mix, as that term is used herein, does not include any added water.

The term "wet mix" and "moisture-adjusted protein mix", the two being used interchangeably, refer to the moisturized dry protein mix, and the amount of moisture, i.e. water, employed is expressed as percent by weight of the total wet mix, i.e. inclusive of moisture.

In the initial step of the process of this invention, a protein mix is formed. The protein mix, which is subsequently moisture adjusted to form a wet mix, can comprise from 30% to 100% by weight of edible protein and preferably comprises from 50% to 100% by weight of an edible protein. If amounts of edible protein less than 30% by weight are employed, insufficient protein is present to produce meat-like fibers having the eating quality of meat, as explained further hereinafter. On the other hand, if desired, the protein mix can comprise 100% of an edible protein.

While excellent fibers can be formed where the protein mix comprises 100% of an edible protein, it is preferred from the standpoint of preparing the most palatable meat analogs that the protein content of the protein mix not be in excess of 80% by weight of an edible protein, and most preferably not in excess of 70% by weight of an edible protein; the remaining portion comprising other ingredients as specified hereinafter.

While not critical to the process of this invention from the standpoint of producing meat-like fibers having the eating quality of meat, but preferable from the standpoint of consumer acceptability, the protein mix can comprise, in addition to an edible protein, certain specific amounts of other ingredients, often referred to as minors, such s preservatives, flavoring, coloring, emulsifiers stabilizers, binders, vitamins, and the like.

No criticality exists with regard to the source of edible protein. The usual source of such proteins is vegetable protein; however, animal protein may also be employed. Examples of suitable vegetable protein sources are soybeans, safflower seed, corn, peanuts, wheat, peas, sunflower seed, cottonseed, coconut, rapeseed, sesame seed, leaf proteins, single cell proteins such as yeast, and the like. Generally, if the protein source is a vegetable protein, the protein prior to use is placed in a relatively pure form. Thus, for example, if the protein source is soybeans, the soybeans may be dehulled and solvent extracted, preferably with hexane, to remove the oil therefrom. The resulting oil-free soybean meal is then suspended in water, and alkali is added to dissolve the protein and leave behind undissolved carbohydrates. Thereafter the protein is precipitated from the alkaline solution by the addition of an acidic substance. Precipitated protein is then washed and dried to prepare a substantially pure protein isolate. Similar methods can be utilized with regard to other cereal sources of protein.

If desired, animal protein sources can be used. These include animal proteins such as those derived from milk, poultry, meat, and/or fish. A typical example of a suitable animal protein is egg albumin.

It is important to note that the protein portion of the dry protein mix can be either a heat-coagulable or any other edible protein. Of course the protein must be water-hydratable protein in order for effective moisturization to occur as will be explained hereinafter.

While it is not essential that the protein be a heat-coagulable protein, heat coagulable proteins can be utilized if desired. As previously mentioned, one of the advantages of this process is that it is not necessarily dependent upon the utilization of heat-coagulable protein in forming the dry protein mix. However, where the protein is not a heat-coagulable protein, as will be explained in more detail hereinafter, it is necessary to utilize binding materials, either in the dry mix or in a separate binding step, i.e. coating the fibers with an edible binder material.

Examples of non-heat-coagulable proteins which can be utilized in the process of this invention are casein, pH 7 soluble protein from cottonseed, pH 4.5 soluble protein from soy, and other small molecular weight vegetable proteins.

From the standpoint of low cost, as well as good fiber formation, generally vegetable protein sources such as soy protein and wheat protein are preferred over animal protein sources.

The wet mix, moisture-adjusted dry mix composition, comprises:

| Wet Mix | Percent By Weight |
|---|---|
| Dry Mix | 90–10 |
| Water | 10–90 |

After forming the protein mix, the moisture content of the protein mix is adjusted to form a wet mix having a moisture content within the range of 10 to 90% by weight of the wet mix. The moisture content of the wet mix should not exceed 90% by weight, because higher moisture contents provide such a low viscosity that during subsequent processing sheeting will not occur.

On the other hand, moisture contents of the wet mix of less than about 10% by weight are undesirable because the material is so viscous as to be extremely difficult to further process.

The precise moisture content within the above specified range to be utilized in any particular process, depends upon the method of sheeting of the wet mix protein dough. For example, if sheeting is to be accomplished by roll milling, it is preferred that the moisture content be within the range of from 15 to 35% by weight, and preferably within the range of from 20 to 30% by weight. However, if other methods are to be employed, such as utilization of drying drums or extrusion into sheets, the moisture content should be considerably higher, for example within the range of from 55% to 80% by weight.

To insure uniform distribution of moisture in the wet mix, after sufficient moisture has been added to provide an adjusted moisture content within the range of from 10 to 90% by weight of the wet mix, the dry mix to which moisture has been added should be mixed to provide a substantially uniform coherent workable protein dough. The exact mixing time utilized is not critical and optimum mixing time is dependent upon the protein source utilized, the composition of the mix, and of course the kind of mixing device employed. The phrase "adjusting the moisture content of the dry mix" as used herein is intended to include adding moisture, i.e. water, within the previously described range and mixing to insure uniform distribution of moisture so as to provide a substantially uniform, coherent workable, dough-like protein wet mix.

No criticality exists in regard to the type of mixing device utilized, and any of those generally available are suitable for the additional mixing. For example, the mixer may be a planetary paddle mixer, a sigma mixer, a ribbon blender a twin paddle mixer, a Hobart mixer, an extruder, and other well known mixers such as Omnimixers.

The next major step of the process of this invention comprises sheeting the moisture-adjusted protein mix which has the appearance of a coherent workable dough very similar to bread dough. This coherent workable protein dough which, as previously indicated, is bread dough-like in texture, character, and workability, is ideally suited for sheeting.

Sheeting can be accomplished perhaps most conveniently by utilization of roll milling. However, it is conceivable that sheeting could be accomplished by other methods such as, for example, extrusion into a sheet.

Sheeting of the wet mix to form a coherent workable protein dough sheet can be accomplished in a two-roll mill, a four-roll mill, an extruder, and the like. It is preferred that where roll milling is employed that differential roll speeds with the faster roll revolving at from 1 to 20% and preferably at least 3% faster speed than the slower roll. This is true because it has been found that where differential roll speeds with the faster roll traveling at least 1% and preferably at 3% greater speed than the slower roll are employed, the sheet will conveniently be fed from the faster moving roll. Preferably, where roll milling is employed the roll speeds are from 2 rpm to 350 rpm, and, where heat coagulation of protein during sheeting is not desired the rolls are maintained at a temperature within the range of from 70° to 150° F and preferably, from 80° to 135° F. However, where some heat coagulation of protein is desired during sheeting, the roll temperature should be adjusted to heat the sheet to temperatures between 155° and 210° F. In some cases fiber character is improved if some heat coagulation occurs during sheeting (see Example VI).

The roll pressure ideally should be within the range of from 10 pi (lbs/linear inch) to 4000 pi. However, as those skilled in the art know, the exact roll peripheral speed, roll temperature, and roll pressures, depend upon the exact material which is to be sheeted and therefore can only be specifically determined under the exact conditions employed. However, it can be stated that generally in regard to pressure, the more pressure the tougher the fibers which are ultimately formed. Preferably, the roll pressure should be within the range of from 1000 pi to 3000 pi to form the most palatable fibers.

Generally, roll conditions should be employed which allow formation of a sheet having a thickness of from about 0.002 to 0.040, inch and preferably, from about 0.005 inch to about 0.030 inch. Sheet thicknesses within these ranges have been found preferable in making excellent meat-like fibers. At thicknesses above 0.040 inch, the material becomes too thick to give an impression of fibers, and at thicknesses less than 0.002 inch, the fibers are too thin to make good meat-like products.

After sheeting, the coherent workable protein dough sheet is cut to form individual strands of dough. Cutting to form individual strands or fibers, the two terms being used interchangeably, of dough can be accomplished in a number of ways. For example, a sheet of coherent workable protein dough can be metered into a rotary cutter comprising an assembly of spaced knife blades mounted on a cylindrically shaped member which in turn is mounted on a rotating shaft member. The cuts are made at an angle perpendicular to the machine flow direction, and accordingly the coherent workable protein dough sheet is cut into a plurality of individual strands of a length equal to the width of the coherent workable dough sheet. Of course, the thickness of the individual strands depends upon the thickness of the sheet, the speed of the sheet, the spacing of the knife blades, and the speed of rotation of the cylindrically shaped knife member, all of which can easily be adjusted to give either thicker or thinner strands. After cutting, the strands which are in parallel alignment can be collected on a conveyor belt and piled to suitable thicknesses to prepare them for the next step of the process.

Of course, other cutting devices besides rotating knife blades can be employed such as, for example, shredding machines such as those commonly utilized in shredding cigarette tobacco or paper. However, if parallel unidirectional fibers are sought, the shredding device must be one which cuts the dough sheet without randomly arranging the fibers; that is, the cutter must cut the dough sheet into a series of aligned strands which are generally parallel in fashion. The previously described rotary cutter is a suitable apparatus for so doing.

After cutting the coherent workable protein sheet to form fiber-like strands, the fibers are next aggregated into a desired fiber alignment. While generally if the object is to simulate the parallel unidirectional fiber alignment of natural meat products, it is desirable to align the fibers in parallel fashion, it may be desired to randomly orient the fibers in a fashion such that a product such as hamburger can be simulated. No criticality exists with regard to the method of aggregating fibers, and aggregation to provide either parallel alignment or random alignment can be employed. Where parallel alignment is desired, the individual fiber strands cut by the previously described rotary cutter can be aggregated by stacking them upon an endless conveyor belt traveling at a predetermined rate such that fiber aggregation by stacking into a desired thickness is accomplished. As used herein the term aggregate is used in its most common manner and means to collect or gather into a mass.

In the broadest aspect of this invention the next and the last step of the process of this invention involves stabilizing the aligned fibers to form a coherent fiber mass cloasely resembling meat in appearance, texture, and eating quality. Stabilization is generally accomplished by heating the aligned fibers at a temperature within the range of from 155° to 400° F. At temperatures within this range the mixture is heat set to insure stabilization within the desired configuration. Preferred stabilization temperatures are within the range of from 170° to 300° F. Temperatures above 400° F should be avoided in order to prevent adverse effects.

The time of heat stabilization necessarily depends upon the size or volume of the mass that is heated. While suitable stabilization can occur without the application of pressure, it is preferred that some pressure be utilized. Where pressure is employed, it can be exerted by the utilization of an autoclave for stabilization, or alternatively the material can be confined within a particular zone such that the tendency toward expansion during stabilization provides the necessary pressure. For example, see commonly assigned application of Alexander L. Liepa entitled "Machine for the Continuous Production of Meat Analogs." In this machine, which comprises two substantially synchronized heated steel belted conveyors having side confining walls, the aligned fibers are conveyed from the wide end of a converging conveyor gap to the narrow end of a converging conveyor gap while simultaneously being heat stabilized.

In a preferred embodiment of this invention an additional step subsequent to cutting the sheet into fibers and prior to the stabilizing step comprises heat treating the fibers or strands in a separate process step. When this is done the fibers are tougher and stronger, after further treatment in accord with the process of this invention, and have a texture of distinctly defined chewy fibers. This heat treating fibers step can conveniently be used when duplicating especially "stringy" or coarse meats such as chuck roast (see Example V). Where the fiber heat treating step is employed, temperatures within the range of 155° to 300° F should be employed along with heat treating times of from a few seconds up to 60 minutes.

If desired, stabilization can occur without heating providing that suitable edible binder materials are utilized. In other words, the gelling properties of certain materials such as some gums and gelatin, as well as starches, may be employed for stabilization, in which case the product need not be heat stabilized. Examples of suitable edible binder materials which can be utilized without the necessity for employing heat stabilization are guar gum, locust bean gum, Carrageenan gum, pectin, gum arabic, gum acacia, agar, cellulose derivatives such as carboxymethyl cellulose, cornstarch, potato starch, wheat starch, tapioca, and the like.

Where edible binders are employed and stabilization is conducted without heating, pressure commpression at pressures of from 0.5 psi to 100 psi are often employed; however, with some binders, the gelling property is sufficient that stabilization will occur merely upon standing for a period of time.

As previously mentioned, although not essential in the broadest aspect of this invention but preferable, an additional step which occurs after fiber alignment and before stabilization, comprises coating the aligned fibers with an edible binder material. Suitable binder materials have previously been mentioned; however, it should be noted that with some edible proteins because of their inherent cohesive character, a thin coating of water alone will act as a suitable binder material. Therefore the use of water as an edible binder for this preferred step also is contemplated by this invention.

Again as previously mentioned, the additional step of coating the aligned fibers with an edible binder is preferred but not essential in the boradest aspect of this invention; however, where the protein portion of the dry protein mix is not a heat coagulable protein, it is essential that the aligned fibers be coated with an edible binder prior to stabilization or that binder be included in the protein mix.

Turning now to a more complete description of the coating step, after the fibers have been aggregated, i.e. aligned into a desired configuration, the aligned fibers can be coated with a suitable edible binder material. Suitable edible binders besides those previously mentioned can be, for example, egg albumen, cereals, dextrose, heat-coagulable proteins, and alginates. Of course, the edible binder must be at least a partially water-soluble edible binding material.

The edible binder is prepared by adding moisture to the edible binder material to form a water-edible binder mixture which is generally from 60 to 80% by weight of water, and preferably from 65 to 75% by weight of water. The edible water-binder mixture can be coated upon the aligned fibers in a number of ways. For example, the edible binder-water mixture can be sprayed upon the aligned fibers, extruded and placed upon the aligned fibers as a thin film, or placed upon the fibers by any other conventional coating means such as, for example, dipping the fibers into the water-edible binder mixture.

The amount of edible binder material placed upon any aligned fiber mass is dependent upon a number of circumstances such as the end product texture desired, the protein material utilized in forming the aggregated fibers, and the particular edible binder employed. However, it has generally been found that to produce a product which has sufficient binder present to impart the necessary cohesiveness to the product such that the product remains together during handling and packaging and yet is not bound so tightly that the mouth eating quality of stringy meat is lost, the ratio of fiber material to binder material where binder is employed should be within the range of from 95:5 to 5:95 and preferably from 75:25 to 20:80.

While not essential to the process of this invention, but preferable from the standpoint of simulating some meat products, vegetable and animal fats or combinations of such fats are normally added to the aligned fibers previous to or simultaneously with coating with edible binders (where coating with edible binders is employed) in order to raise the fat content of the protein fiber. The fat content is usually adjusted to simulate a pre-selected meat product. The type of fat is often selected for reasons of market objectives and the like. For instance, a vegetable fat such as cottonseed oil has been used when an unsaturated fat is desired for simulated meat containing no animal products. Where there is no objection to the use of an animal fat, such fats may be incorporated into the fiber to achieve the desired fat level. Other ingredients such as flavoring agents, coloring, seasoning, and the like can also be added to the fat composition to simulate any particular meat product.

Suitable fats for utilization in the fat composition are well known and generally comprise liquid or semi-liquid glyceride shortenings derived from animal, vegetable, or marine fats and oils, including synthetically prepared shortenings. These glycerides can contain saturated or unsturated "long chain" acyl radicals having from about 12 to about 22 carbon atoms such as lauroyl, lauroleoyl, myristoyl, myristoleoyl, palmitoyl, palmitoleoyl, stearoyl, oleoyl, linoleoyl, linolenoyl, arachidoyl, arachidonyl, behenoyl, erucoyl, and the like, and are generally obtained from edible fats and oils such as cottonseed oil, soybean oil, coconut oil, rapeseed oil, peanut oil, olive oil, palm oil, palm kernel oil, sunflower seed oil, rice bran oil, corn oil, sesame seed oil, safflower oil, wallflower oil, nasturtium seed oil, whale oil, sardine oil, herring oil, menhaden oil, pilchard oil, lard, tallow and the like. These glycerides can also contain, in part, one or two short chain acyl groups having from 2 to about 6 carbon atoms such as acetyl, propanoyl, butanoyl, valeryl, and caproyl; they can be prepared by random or low-temperature interesterification reactions of fatty triglyceride-containing oils and fats, such as interesterified or rearranged cottonseed oil and lard; and they can be otherwise formed by various organic syntheses. Where a fat composition is employed, it is generally preferred that the fat composition be utilized at a ratio of from 1:0.1 to 1:4 of fibrous material to fat material.

If desired, the edible binder, where one is employed, and the fat composition can be mixed together along with flavoring, dyes, and other minors and simultaneously placed upon the aligned fibers.

After stabilization in the manner previously described is completed, the product may be cut or otherwise formed into suitable shapes, dried, coated with any additional substance, fried, frozen, sterilized, heated, or otherwise treated and thereafter packaged for use.

The following Examples are offered to further illustrate but not limit the process of the invention.

EXAMPLE 1

1000 grams of the following dry protein mix was prepared by mixing the dry ingredients in a Hobart C-100 mixer for 25 minutes at 60 rpm:

| Ingredient | Amount (grams) |
|---|---|
| Egg white solids* | 120 |
| Lactalbumen* | 122 |
| Soy protein isolate* | 686 |
| Beef flavor | 62 |
| Shortening | 10 |
| & Total dry mix | 1000 |

*Heat coagulable protein 316 grams of water at room temperature (75° F) along with 0.1 gram papain, a proteolytic enzyme, was added to the dry mix and mixed for 40 seconds at 60 rpm to form a moisturized dough-like protein wet mix. The protein wet mix contained 24% moisture.

The moisture-adjusted wet mix was fed into the hopper of a Farrell 2-roll mill. The roll speed was adjusted so that one roll rotated about 20% faster (about 6 rpm) than the other roll; both rolls were at room temperature (75°F). Sheeting of the protein dough to form a coherent workable protein dough sheet resulted; the sheet was transferred to the faster roll and was removed from the roll by physically pulling it therefrom. The distance between the rolls was adjusted to produce a sheet of 15/1000 inch thickness. The sheet was smooth, translucent, pink in color, and noted to be quite strong. The 15/1000 inch thick sheet was cut into approximately 4 inch×8 inch pieces, and these pieces of sheet were aggregated by stacking to form a stack of 64 sheets. The stack was compressed by hand between two wooden boards such that it had a thickness of approximately 1 inch. Thereafter the stack was cut into individual fibers utilizing a Hobart meat cutter. Each cut produced 64 fibers and the fibers were separated easily from each other and measured and shown to have a cross-sectional dimension ranging from 8/1000 inch up to a maximum of 30/1000. Thereafter the fibers were aggregated into a substantially parallel alignment. The weight of the fiber bundle was approximately 250 grams.

The following mixture was prepared for use as an edible binder:

| Ingredients | Amount (grams) |
|---|---|
| Egg white solids | 5.713 |
| Soy protein isolate | 27.254 |
| Gelatin | 12.240 |
| Shortening (soybean oil) | 32.640 |
| IFF beef flavor | 3.298 |
| Caramel color | 0.392 |
| *Red Lake No. 4 | 0.039 |
| *Blue Lake No. 1 | 0.024 |
| Water | 122.400 |
|  | 204.000 |

*dyes

All of the edible binder dry ingredients were mixed in a Hobart C-100 mixer for 10 minutes at 60 rpm. Thereafter vegetable oil (shortening) was added and mixed for an additional 5 minutes. Finally, 122.4 grams of water was added and mixing was continued for 15 more minutes at 60 rpm. The mixture was brown and had a consistency somewhat thicker than cake batter; the moisture content was 60%.

A small open box was made of separate layers of aluminum foil. The box was approximately 2½ inches wide, 4 inches long, and 2 inches deep. A layer of fibers was placed in the bottom of the box; a layer of edible binder was poured over the fibers; a layer of fibers was next placed over the mixture, and so on, alternating fibers and binder material until the box was filled. The box was then loosely wrapped in aluminum foil and placed in an autoclave and heated for 60 minutes at 20 psi at a temperature of 160° C.

Examination of the product showed a dark brown mass in which lighter colored fibers were visible. Eating quality was fibrous and resembled mat eating quality. The ratio of fibers:binder material was 38:62Substantially similar results are obtained where casein is substituted for the protein of the dry mix of this Example and where the total protein content of the dry protein mix is 65%, and 75%.

EXAMPLE II 992 grams of the following dry protein mix was prepared by mixing the dry ingredients in a Hobart C-100 mixer for 5 minutes at 60 rpm.

| Ingredients | Amount (grams) |
|---|---|
| Egg white solids* | 100 |
| Lactalbumin* | 149 |
| Soy protein isolate* | 674 |
| Beef flavor | 59 |
| Shortening (soybean oil) | 10 |
| & Total dry mix | 992 |

*Heat coagulable protein

The dry mix contained 93% protein. 404 grams of water was then added to obtain a wet mix containing 29% by weight water. The wet mix was mixed about 1 minute at 60 rpm. The wet mix was passed through an extruder equipped with a die and rotary cutter to produce homogeneous dough pellets. The pellets were fed into a 2-roll mill to produce a dough sheet about 0.025 inches thick. Rolling conditions were as follows:
Roll velocity: About 3.5 rpm
Roll velocity difference: Front roll about 3% faster than rear roll.
Roll temperature: Front roll 110° F, rear roll 95° F.
Roll pressure: Estimated to be 1000 p.i.

The dough sheet was cut using a rotary cutter to produce fibers about 0.020 inches wide and 12 inches long. The fibers were aggregated in parallel alignment.

A binder mix was prepared of the following composition:

| Ingredients | Amount (grams) | |
|---|---|---|
| Egg white solids | 40 | |
| Gelatin | 182 | |
| Beef flavor | 18 | |
| Water | 584 | (70.5% by wt. H$_2$O) |
| & Total | 824 | |

This was mixed in Hobart mixer 10 minutes at 60 rpm.

A fat mix composition having the following composition was made:

| Ingredients | Amount (grams) |
|---|---|
| Soybean oil | 80 |
| Egg white solids | 10 |
| Water | 10 |
| & Total | 100 |

A meat analog was then made of the following composition:

| | | |
|---|---|---|
| Fiber material | 33% | |
| Binder material | 54% | Fiber material: binder material ratio is 1:1.64 |
| Fat material | 13% | Fiber material: fat material ratio is 1.0:0.4 |
| | 100% | |

The analog was prepared by alternating layers of fiber material and binder material as described in Example I. The fat material created a non-uniform fatty texture similar to that of fatty meat such as bacon.

The total weight of analog was 750 grams. The analog was compressed at a pressure of 0.5 psi between two parallel stainless steel plates and stabilized in an autoclave for one hour at 170° F.

The finished product was in the form of a slab about 1½ inches thick, 4 inches wide and 11 inches long. It was fibrous and had a meat-like appearance, texture and eating quality. It was judged to be very similar to meat in eating quality when evaluated in a casserole meal.

EXAMPLE III

Several batches of dry protein mix were prepared in a Hobart mixer. Mixing time was about 5 minutes at 60 rpm; the dry mix formula was as follows:

| Ingredients | Percent By Weight of Total Dry Mix Composition |
|---|---|
| *Dried egg white | 7.0 |
| *Soy protein isolate | 77.4 |
| *Lactalbumen | 4.8 |
| Knox gelatin | 3.7 |
| Beef flavor | 6.1 |
| Soybean oil | 1.0 |
| | 100.0% |

*heat-coagulable protein

To each batch of dry protein mix water was added to obtain a wet mix containing 28% moisture. The wet mix was mixed about 1 minute. Each batch of wet mix was then passed through an extruder equipped with a die having ¼ inch diameter round holes and a rotary cutter. The extruded dough which now was homogeneous was cut to form thin pellets. The pellets were continuously fed into a 2-roll mill rotating at about 2 rpm. The front roll rotated about 4% faster than the rear roll; front roll temperature was 110° F, rear; roll temperature was 75° F, and the roll pressure was estimated to be 1000 p.i. The dough was transferred to the front roll. The distance between the rolls was adjusted to produce a sheet 0.015 inch thick. The continuous dough sheet was conveyed to a continuous rotary cutter which was operated at a velocity to produce fibers about 0.015 inch wide. The fibers were aggregated on a conveyor belt in substantially parallel alignment. The fibers were then transferred to another conveyor which was operated at a speed to aggregate, i.e. collect, a layer of fibers about ⅛ inch thick. The layer of fibers was sprayed with water using an atomizing spray nozzle. Ratio of fibers to water was approximately 80:20 by weight. The layer of fibers was continuously fed on the lower belt of a 2-belt cooker conveyor used for stabilization. Since the speed of the cooker-conveyor was considerably slower than the speed of the conveyor containing the wet fibers, a continuous layer about 2½ inches thick was built on the belt of the cooker conveyor. The upper belt of the cooker conveyor was adjusted to produce a 2:1½ compression ratio. Both belts of the cooker conveyor were maintained at 250° F; belt velocity as adjusted to produce a cooking time (residence time in the stabilization zone) of 1 hour. The stabilized product emerging from the cooking conveyor was a continuous slab 1½ inch thick and 12 inches wide. The product was fibrous and had a meat-like appearance, texture, and eating quality.

EXAMPLE IV

Another production run was performed under identical conditions as those given in Example III but the fibers, in addition to being wetted with water as in Example III, were non-uniformly coated with soybean oil fat composition. This was done just prior to the stabilization step. The soybean oil was applied in a thin stream through a nozzle. Flow rates were adjusted to obtain a wet product of the following composition:

| Fibers | 65% |
|---|---|
| Water | 20% |
| Soybean oil | 15% |
| | 100% |

The wet product was stabilized by continuously processing through the stabilizing cooking-conveyor as in Example III. The finished product was fibrous and resembled cooked meat in appearance, texture, and eating quality.

EXAMPLE V

A dry protein mix was prepared using the same method of mixing and having the same composition as in Example I. Water (containing no enzyme) at room temperature was added to the dry mix to form a wet mix containing 29% moisture. The wet mix was mixed, extruded, pelletized, sheeted and cut into parallel fibers (as in Example III, except that front roll and rear roll temperatures were both 190° F, the sheet thickness was 0.010 inch, and the sheet was cut into 0.010 inch wide fibers). The fibers were aggregated into a bundle of fibers which was loosely wrapped in aluminum foil and the fibers were heat treated in an oven for 40 minutes at 250° F. Examination of the fibers after heat treating showed that the fibers had become much tougher and stronger than before but were still moist and could be easily separated from one another.

The following composition was prepared for a binder as in Example I:

| Egg white solids | 70 grams |
|---|---|
| Soy protein isolate | 214 |
| Gelatin | 150 |
| Shortening (soybean oil) | 400 |
| Beef flavors | 96 |
| Freeze-dried blood | 60 |
| Water | 1860 |
| & Total | 2850 grams |

The heat treated fibers were spread on aluminum foil and coated with the binder. The ratio of fibers to binder was 233 to 446 by weight. The wet fibers were then aggregated by pushing them together, while maintaining the parallel alignment, to form a bundle about one inch in diameter. The fiber bundle was wrapped in aluminum foil and stabilized in an autoclave for 20 minutes at 160° C.

Another binder-coated fiber bundle was prepared and heated in the autoclave as described above, except that the fibers after cutting received no heat-treatment.

Examination of the two finished products showed that both were fibrous and meat-like in appearance, texture and eating quality. However, the meat analog made from the heat-treated fibers had a texture having better defined, more chewy fibers than the meta analog made from non-heat-treated fibers and consequently resembled very coarse cooked beef more closely in all properties.

EXAMPLE VI

Two batches of protein fibers were prepared using the same methods as in Example V except that in Batch A mill roll temperatures were 110° F and in Batch B the temperatures were 200° F so as to allow some heat coagulation during sheeting. Both batches of fibers were then coated with binder using the same composition and methods including treating in the autoclave as in Example V.

Examination of the two meat analogs showed that both were meat-like in appearance, texture, and eating quality. However, analog B was judged to resemble coarse, cooked beef more closely than analog A because in B the fibers were more distinct, better defined, and had a more chewy eating quality.

What is claimed is:

1. A process of making meat analogs which comprises forming a dry protein mix wherein the protein is a water hydratable heat-coagulable protein, adjusting the moisture content of the dry mix to form a dough-like protein wet mix, sheeting the protein wet mix to form a coherent workable protein dough sheet, cutting the sheet to form fiber-like strands, aggregating the strands into a desired fiber alignment, and stabilizing the fibers to form a coherent fiber mass resembling meat in appearance, texture, and eating quality.

2. The process of claim 1 wherein the dry protein mix comprises from 30 to 100% by weight of protein.

3. The process of claim 2 wherein the dry protein mix comprises from 50 to 100% by weight of protein.

4. The process of claim 3 wherein the dry protein mix prior not in excess of 80% by weight of protein.

5. The process of claim 4 wherein the dry protein mix comprises not in excess of 70% by weight of protein.

6. The process of claim 1 wherein the wet mix comprises from 10 to 90% dry mix and the remaining portion water.

7. The process of claim 6 wherein the wet mix comprises from 15 to 35% by weight of water.

8. The process of claim 7 wherein the wet mix comprises from 20 to 30% by weight of water.

9. The process of claim 1 wherein an additional step prior to stabilization comprises adding fat composition to the fiber-like strands.

10. The process of claim 9 wherein the fat composition is added at a weight ratio of from 1:0.1 to 1:4 of fibrous material to fat material.

11. A process of making meat analogs which comprises forming a dry protein mix wherein the protein is a water hydratable protein adjusting the moisture content of the dry mix to form a dough-like protein wet mix, sheeting the protein wet mix to form a coherent workable protein dough sheet, cutting the sheet to form fiber-like strands, aggregating the strands into a desired fiber alignment, coating the aligned fibers with an edible binder material, and stabilizing the binder-coated fibers to form a coherent fiber mass resembling meat in appearance, texture and eating quality.

12. The process of claim 11 wherein the protein of the dry mix is a non-heat-coagulable protein.

13. The process of claim 11 wherein the dry protein mix comprises from 30 to 100% by weight of protein.

14. The process of claim 13 wherein the dry protein mix comprises from 50 to 100% by weight of protein.

15. The process of claim 14 wherein the dry protein mix comprises not in excess of 80% by weight of protein.

16. The process of claim 15 wherein the dry protein mix comprises not in excess of 70% by weight of protein.

17. The process of claim 11 wherein the wet mix comprises from 10 to 90% dry mix and the remaining portion water.

18. The process of claim 17 wherein the wet mix comprises from 15 to 35% by weight of water.

19. The process of claim 18 wherein the wet mix comprises from 20 to 30% by weight of water.

20. The process of claim 11 wherein the edible binder material comprises from 60 to 80% by weight of water.

21. The process of claim 20 wherein the edible binder material comprises from 65 to 75% by weight of water.

22. The process of claim 20 wherein the weight ratio of fiber material to binder material is from 95:5 to 5:95.

23. The process of claim 22 wherein the weight ratio of fiber material to binder material is from 75:25 to 20:80.

24. The process of claim 22 wherein an additional step pior to stabilization comprises adding fat composition to the fiber-like strands.

25. The process of claim 24 wherein the fat composition is added at a weight ratio of from 1:0.1 to 1:4 of fibrous material to fat material.

26. The process of claim 1 wherein stabilization is accomplished by heating.

27. The process of claim 11 wherein stabilization is accomplished by heating.

28. The process of claim 27 wherein the temperature during heating is from 155° to 400° F.

29. The process of claim 28 wherein the temperature is from 170° to 300° F.

30. The process of claim 26 wherein the temperature during heating is from 155° to 400° F.

31. The process of claim 30 wherein the temperature is from 170° to 300° F.

32. The process of claim 6 wherein an additional step subsequent to cutting the sheet but prior to stabilization comprises heat treating the fibers to produce strong, distinctly defined chewy fibers especially adapted for use in duplicating the eating quality of coarse meats.

33. The process of claim 6 wherein during sheeting the sheet is heated to temperatures within the range of from 155° to 210° F to provide some heat coagulation of protein during sheeting.

34. The process of claim 17 wherein an additional step subsequent to cutting the sheet but prior to stabilization comprises heat treating the fibers to produce strong, distinctly defined chewy fibers especially adapted for use in duplicating the eating quality of coarse meats.

35. The process of claim 17 wherein during sheeting the sheet is heated to temperatures within the range of from 155° to 210° F to provide some heat coagulation of protein during sheeting.

36. The product of the process of claim 11.

37. A process of making meat analogs which comprises forming a dry protein mix, wherein the protein is a water hydratable protein, adjusting the moisture content of the dry mix to form a dough-like protein wet mix, sheeting the protein wet mix to form a coherent workable protein dough sheet, metering the coherent workable protein dough sheet into a rotary cutter comprising an assembly of space knife blades mounted on a cylindrical shaped member wherein the coherent workable dough sheet is cut at an angle perpendicular to the machine flow direction to provide a plurality of individual strands of a length equal to the width of the coherent workable dough sheet, aggregating said strands into a desired fiber alignment, coating the aligned fibers with an edible binder material, and stabilizing the binder coated fibers to form a coherent fiber mass resembling meat in appearance texture and eating quality.

38. The process of claim 37 wherein aggregation of said strands is accomplished by collecting them on a conveyor belt as they are removed from said rotary cutter.

* * * * *

UNITED STATES PATENT AND TRADEMARK OFFICE
CERTIFICATE OF CORRECTION

PATENT NO. : 4,001,441
DATED : January 4, 1977
INVENTOR(S) : ALEXANDER L. LIEPA

It is certified that error appears in the above-identified patent and that said Letters Patent are hereby corrected as shown below:

| COL. | LINE | |
|---|---|---|
| 2 | 27 | "whiched" should be -- wiched -- |
| 4 | 1 | "s" should be -- as -- |
| 4 | 2 | insert a comma after "emulsifiers" |
| 4 | 34 | insert a hyphen after "heat" |
| 6 | 19 | "0.040,inch" should be -- 0.040 inch, -- |
| 8 | 2 | "commpression" should be -- compression -- |
| 9 | 17 | "unsturated" should be -- unsaturated -- |
| 9 | 65 | in Table, delete "&" |
| 10 | 67 | "mat" should be -- meat -- |
| 10 | 68 | "38.62Substan-" should be -- 38.62. Substan- -- |
| 11 | 18 | in Table, delete "&" |
| 11 | 46 | in Table, delete "&" |
| 11 | 59 | in Table, delete "&" |
| 12 | 47 | delete the semicolon |
| 13 | 1 | "as" should be -- was -- |

UNITED STATES PATENT AND TRADEMARK OFFICE
CERTIFICATE OF CORRECTION

PATENT NO. : 4,001,441
DATED : January 4, 1977
INVENTOR(S) : ALEXANDER L. LIEPA

It is certified that error appears in the above-identified patent and that said Letters Patent are hereby corrected as shown below:

| COL. | LINE | |
|---|---|---|
| 13 | 59 | in Table, delete "&" |
| 14 | 8 | "meta" should be -- meat -- |
| 14 | 45 | "prior" should be -- comprises -- |
| 14 | 63 | insert a comma after "protein" |
| 15 | 36 | "pior" should be -- prior -- |

Signed and Sealed this

Thirty-first Day of January 1978

[SEAL]

Attest:

RUTH C. MASON
Attesting Officer

LUTRELLE F. PARKER
Acting Commissioner of Patents and Trademark

UNITED STATES PATENT OFFICE
CERTIFICATE OF CORRECTION

Patent No. 4,001,441                    Dated January 4, 1977

Inventor(s) Alexander L. Liepa

It is certified that error appears in the above-identified patent and that said Letters Patent are hereby corrected as shown below:

| COL. | LINE | |
|---|---|---|
| 2 | 27 | "whiched" should be -- wiched -- |
| 4 | 1 | "s" should be -- as -- |
| 4 | 2 | insert a comma after "emulsifiers" |
| 4 | 34 | insert a hyphen after "heat" |
| 6 | 19 | "0.040,inch" should be -- 0.040 inch, -- |
| 8 | 2 | "commpression" should be -- compression -- |
| 9 | 17 | "unsturated" should be -- unsaturated -- |
| 9 | 65 | in Table, delete "&" |
| 10 | 67 | "mat" should be -- meat -- |
| 10 | 68 | "38.62Substan-" should be -- 38.62. Substan- -- |
| 11 | 18 | in Table, delete "&" |
| 11 | 46 | in Table, delete "&" |
| 11 | 59 | in Table, delete "&" |
| 12 | 47 | delete the semicolon |
| 13 | 1 | "as" should be -- was -- |

UNITED STATES PATENT OFFICE
CERTIFICATE OF CORRECTION

Patent No. 4,001,441　　　　　　　　Dated January 4, 1977

Inventor(s) Alexander L. Liepa

It is certified that error appears in the above-identified patent and that said Letters Patent are hereby corrected as shown below:

| COL. | LINE | |
|---|---|---|
| 13 | 59 | in Table, delete "&" |
| 14 | 8 | "meta" should be -- meat -- |
| 14 | 45 | "prior" should be -- comprises -- |
| 14 | 63 | insert a comma after "protein" |
| 15 | 36 | "pior" should be -- prior -- |

Signed and Sealed this

Fourteenth Day of February 1978

[SEAL]

Attest:

RUTH C. MASON　　　　　　LUTRELLE F. PARKER
Attesting Officer　　　　Acting Commissioner of Patents and Trademarks